United States Patent
Lo

(10) Patent No.: US 9,400,825 B2
(45) Date of Patent: Jul. 26, 2016

(54) PIVOT ANALYSIS METHOD USING CONDITION GROUP

(71) Applicant: Strategy Companion Corporation, Taipei (TW)

(72) Inventor: Ming-Che Lo, Taoyuan (TW)

(73) Assignee: STRATEGY COMPANION CORPORATION, Taipei (TW)

( * ) Notice: Subject to any disclaimer, the term of this patent is extended or adjusted under 35 U.S.C. 154(b) by 204 days.

(21) Appl. No.: 13/901,349

(22) Filed: May 23, 2013

(65) Prior Publication Data

US 2014/0351200 A1 Nov. 27, 2014

(51) Int. Cl.
*G06F 17/30* (2006.01)

(52) U.S. Cl.
CPC .... *G06F 17/30563* (2013.01); *G06F 17/30398* (2013.01)

(58) Field of Classification Search
CPC ............ G06F 17/30592; G06F 17/30563
USPC ......................................... 707/602
See application file for complete search history.

(56) References Cited

U.S. PATENT DOCUMENTS

| 6,092,035 A * | 7/2000 | Kurachi et al. ............... 704/3 |
| 7,010,546 B1 * | 3/2006 | Kolawa et al. ............. 707/694 |
| 8,818,838 B1 * | 8/2014 | Sharma ...................... 705/7.29 |
| 8,838,887 B1 * | 9/2014 | Burke et al. ................. 711/112 |
| 2003/0182310 A1 * | 9/2003 | Charnock et al. ......... 707/104.1 |
| 2004/0169688 A1 * | 9/2004 | Burdick et al. ............. 345/854 |
| 2006/0101329 A1 * | 5/2006 | Han et al. .................... 715/513 |
| 2007/0260578 A1 * | 11/2007 | Ghosh ............................. 707/2 |
| 2008/0162554 A1 * | 7/2008 | Martino et al. ......... 707/103 Y |
| 2009/0150426 A1 * | 6/2009 | Cannon et al. ............. 707/102 |
| 2009/0282324 A1 * | 11/2009 | Patel .......................... 715/212 |
| 2013/0179443 A1 * | 7/2013 | Noel ........................... 707/736 |

* cited by examiner

*Primary Examiner* — Hosain Alam
*Assistant Examiner* — Saba Ahmed
(74) *Attorney, Agent, or Firm* — Maschoff Brennan

(57) ABSTRACT

A pivot analysis method using a condition group is applicable to a front end processing device and includes the following steps. A file name processing interface is presented according to a plurality of file names. A file name selection value is received via a first sub interface of the file name processing interface. A range setting value is received via a second sub interface of the file name processing interface. A file name computing value is received via a third sub interface of the file name processing interface. A file name processing value generated by integrating the file name selection value, the file name range setting value and the file name computing value, is outputted. A multidimensional array is received to present a pivot analysis table.

11 Claims, 10 Drawing Sheets

| | Sales Volume | Order Volume |
|---|---|---|
| Cal1 | 1.2M | 99,000 |
| Cal2 | 1.7 | 22,000 |

PIVOT ANALYSIS METHOD USING CONDITION GROUP

TECHNICAL FIELD

The disclosure relates to a pivot analysis method using a condition group, more particularly to a pivot analysis method that an on-line analytical processing (OLAP) system selects data by using a condition group.

BACKGROUND

Typical applications of on-line analytical processing (OLAP) system require the fast access of multidimensional data. Data warehouse implemented in the OLAP system is a central database used for storing important data collected by various business systems belonging to a company. The central database of the data warehouse generally connects to a main server in the OLAP system.

The OLAP system enables users to acquire data in various dimensions easily and selectively and to review a table established according to the acquired data. For example, when data analysis is requested, the OLAP system provides a trail balance presenting sales information associated with all products sold in a certain electronic company for comparison. For instance, the sales information includes the profit data of a mobile phone on a current month and a previous month and the sales volumes of various mobile phones in the same period.

For a conventional OLAP system, it requires data warehouse tools to generate a statement for the aforementioned comparison results. The data warehouse tools organize data values in a form in a relational database into a cube having a multidimensional structure, and then generate a pivot analysis table according to the dimensionality, attributes and structure of cube.

However, such a pivot analysis table only shows attributes of the selected data values for comparison, where the conventional OLAP system have not processed the dimensionality, attributes and structure of the selected data values. To process the dimensionality, attributes and structure of data values additionally, extra data tables are required. After the dimensionality, attributes and structure of data values are processed, the conventional OLAP system outputs another pivot analysis table according to the processed dimensionality, attributes and structure of data values. This procedure is very complicated, requires more storage space and has errors easily.

Therefore, a more efficient pivot analysis method is required in the art to provide a fast way between data processing and data presentation and to present computing relationships and comparison relationships among data values.

SUMMARY

A pivot analysis method using a condition group according to an embodiment of the disclosure is applicable to a front end processing device and includes the following steps. A file name processing interface is presented according to file names. A file name selection value is received via a first sub interface of the file name processing interface. A range setting value is received via a second sub interface of the file name processing interface. A file name computing value is received via a third sub interface of the file name processing interface. A file name processing value generated by integrating the file name selection value, the file name range setting value and the file name computing value is outputted. A multidimensional array is received, and then a pivot analysis table is presented according to the multidimensional array.

A pivot analysis method using a condition group according to an embodiment of the disclosure is applicable to a back end processing device and includes the following steps. A file name processing value is received. Data values in a database are acquired according to the file name processing value. A multidimensional array is generated according to the data values and the file name processing value, and is outputted.

A pivot analysis method using a condition group according to an embodiment of the disclosure is applicable to a front end processing device and a back end processing device and includes the following steps. File names in a database are outputted from the back end processing device to the front end processing device. The file names are received by the front end processing device. A file name processing interface is presented by the front end processing device according to the file names. A file name selection value is received through a first sub interface of the file name processing interface by the front end processing device. A range setting value is received through a second sub interface of the file name processing interface by the front end processing device. A file name computing value is received through a third sub interface of the file name processing interface by the front end processing device. A file name processing value is outputted from the front end processing device to the back end processing device, and the file name processing value is generated by integrating the file name selection value, the file name range setting value and the file name computing value. A file name processing value is received from the front end processing device by the back end processing device. Data values in the database are acquired according the file name processing value by the back end processing device. A multidimensional array is generated according to the data values and the file name processing value by the back end processing device. The multidimensional array is outputted from the back end processing device to the front end processing device. The multidimensional array is received by the front end processing device. A pivot analysis table is presented according to the multidimensional array by the front end processing device.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
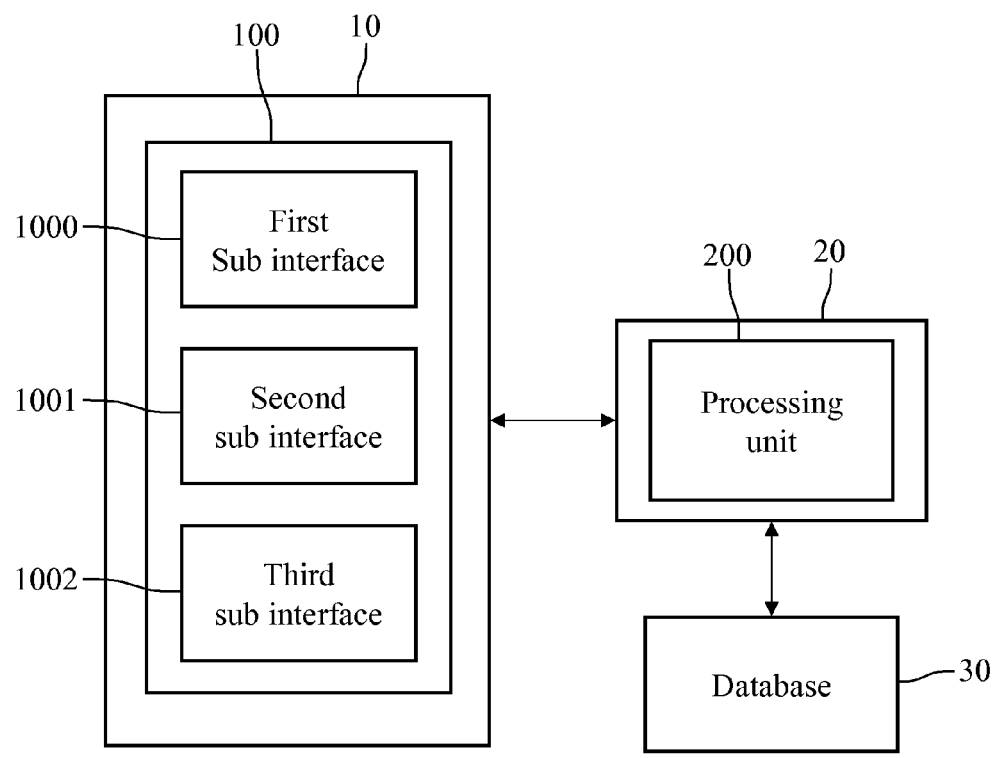
FIG. 1 is a schematic diagram of a pivot analysis system using a condition group according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a pivot analysis system using a condition group according to an embodiment of the disclosure. A pivot analysis system 1 includes a front end processing device 10, a back end processing device 20 and a database 30. The front end processing device 10 connects to the back end processing device 20 through, for example, a network. The back end processing device 20 connects to the database 30 through, for example, the network.

The database 30 is, for example, a relational database. The database 30 stores and arranges a plurality of file names and a plurality of data values, and each file name corresponds to one or more data values. For example, the file name is Color, and the data values corresponding to the file name of Color can be Red, Green and Yellow. The data values are in a multidimensional and hierarchical form. The back end processing device 20, e.g. an OLAP system server, includes a processing unit 200. In this and some embodiments, the database 30 can be built in the back end processing device 20.

The front end processing device 10 includes a file name processing interface 100. The front end processing device 10 can be, for example, a table computer or a notebook. For example, the file name processing interface 100 is a user interface using windows in web page protocol. The file name processing interface 100 includes a first sub interface 1000, a second sub interface 1001 and a third sub interface 1002. The first sub interface 1000 is used for selecting one of the file names and selecting secondary file names which corresponding to the selected file name, thereby obtaining a file name selection value. Secondary file names are more accurate search results belonging to the selected file name. The second sub interface 1001 is used for selecting one of the file names and setting ranges of data values corresponding to the selected file name, thereby obtaining a file name range setting value. The third sub interface 1002 is used for selecting at least two of the file names and setting a commuting relationship between data values of the selected file names. The first sub interface 1000, the second sub interface 1001 and the third sub interface 1002 are, for example, window operation interfaces. The detailed operation of the pivot analysis system 1 is described as follows.

Figure 2:
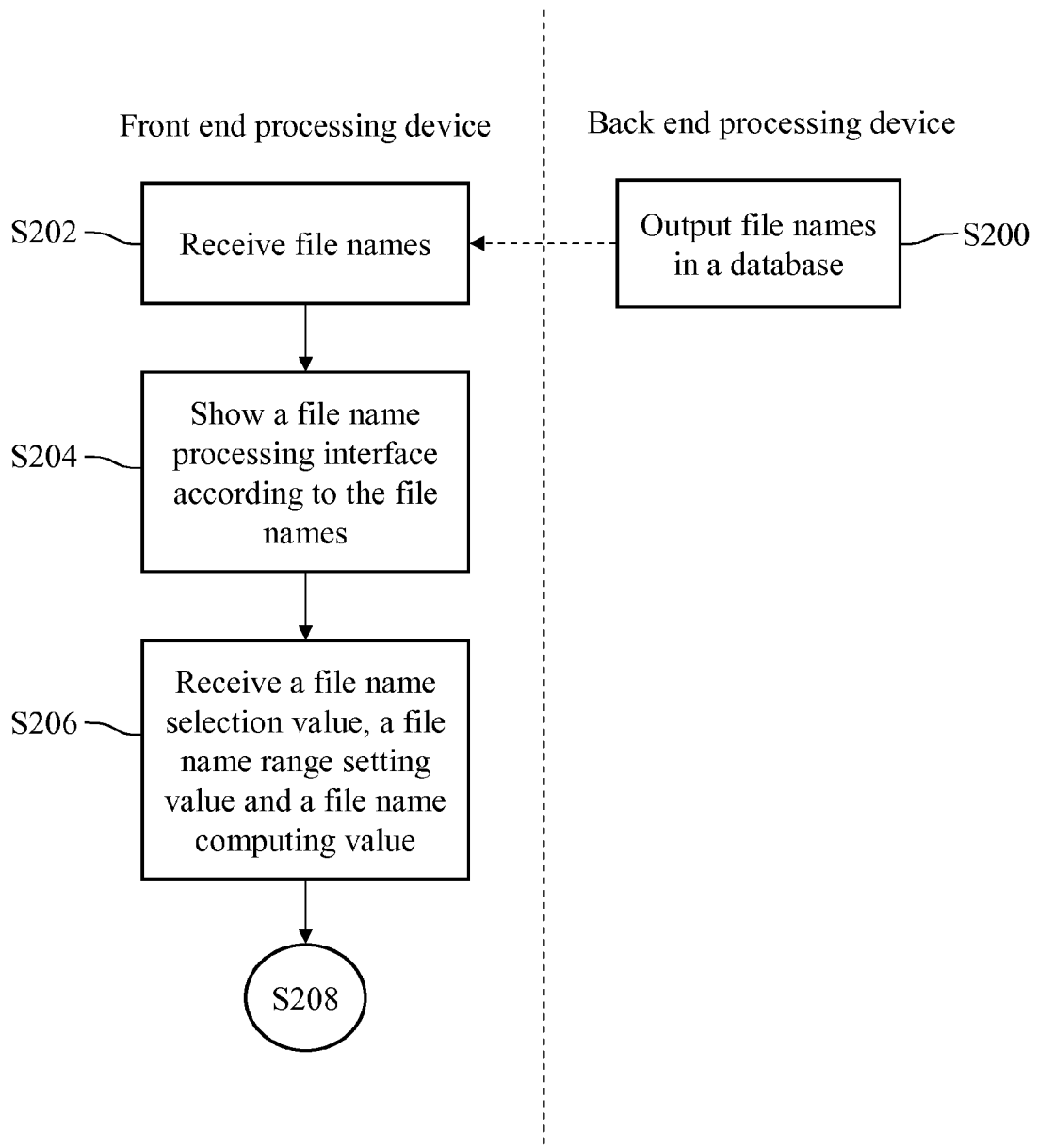
FIG. 2 and FIG. 3 show a flowchart of a pivot analysis method using a condition group according to an embodiment of the disclosure.
Figure 3:
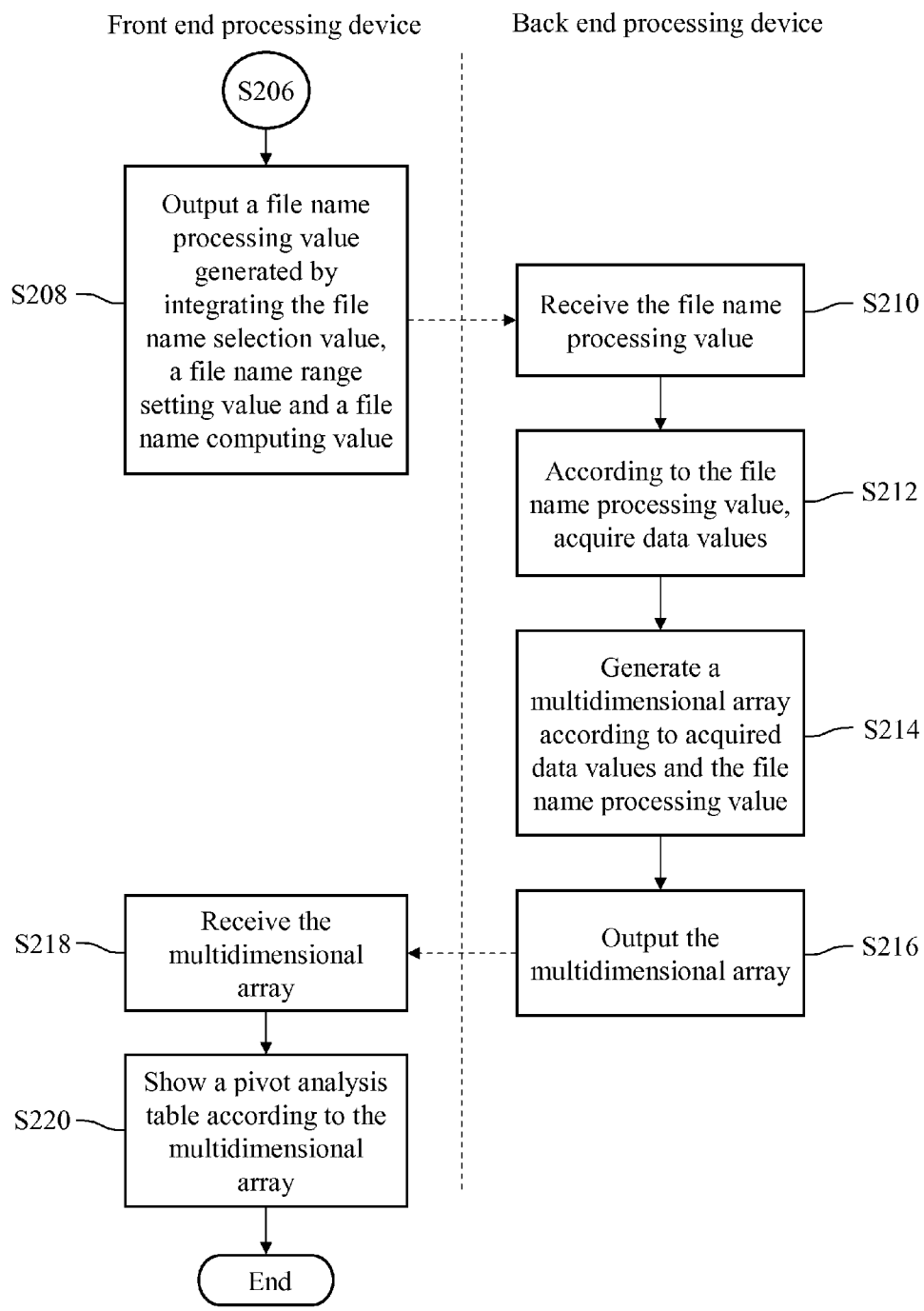

Refer to FIG. 1 and to FIG. 2 and FIG. 3 illustrating a pivot analysis method using a condition group according to an embodiment of the disclosure. Firstly, the back end processing device 20 outputs a plurality of file names stored in the database 30 (step S200). In other words, the back end processing device 20 connected to the database 30 acquires the file names from the database 30 and outputs the acquired file names to the front end processing device 10. Each file name corresponds to at least one data value.

After receiving the file names (step S202), the front end processing device 10 shows the file name processing interface 100 according to the received file names (step S204). Through the first sub interface 1000, the second sub interface 1001 and the third sub interface 1002 in the shown file name processing interface 100, the front end processing device 10 respectively acquires a file name selection value, a file name range setting value and a file name computing value (step S206). When the desired file name is selected via the first sub interface 1000, the front end processing device 10 receives a file name selection value via the first sub interface 1000. When ranges of data values corresponding to the selected file name is set via the second sub interface 1001, the front end processing device 10 receives a file name range setting value corresponding to the selected file name, via the second sub interface 1001. When computing relationships between data values corresponding to the selected at least two file names are set via the third sub interface 1002, the front end processing device 10 obtains a file name computing value corresponding to the selected file names, via the third sub interface 1002. The file name computing value includes a column computing result, a row computing result and a percentage which are set according to the file names.

In one embodiment, the first sub interface 1000, the second sub interface 1001 and the third sub interface 1002 can be set independently and discontinuously for obtaining their setting result. When one of the first sub interface 1000, the second sub interface 1001 and the third sub interface 1002 is set, corresponding one of the file name selection value, the file name range setting value and the file name computing value will be obtained. In one embodiment, the first sub interface 1000, the second sub interface 1001 and the third sub interface 1002 can be set dependently. When more than one of the first sub interface 1000, the second sub interface 1001 and the third sub interface 1002 are set continuously, corresponding ones of the file name selection value, the file name range setting value and the file name computing value will be obtained.

After receiving the file name selection value, the file name range setting value and the file name computing value, the front end processing device 10 integrates the file name selection value, the file name range setting value and the file name computing value into a file name processing value and outputs the file name selection value to the back end processing device 20 (step S208). In the case of setting the first sub interface 1000, the second sub interface 1001 and the third sub interface 1002 independently, one of the file name selection value, the file name range setting value and the file name computing value is obtained according to the current setting, and the rest of the file name selection value, the file name range setting value and the file name computing value are obtained from the database 30. For instance, the file name selection value is obtained according to the current setting, and the file name range setting value and the file name computing value which are set in advance and stored in the database 30 are obtained from the database 30. In the case of setting the first sub interface 1000, the second sub interface 1001 and the third sub interface 1002 dependently, the file name selection value, the file name range setting value and the file name computing value have to be obtained one by one according to the current setting. For instance, the front end processing device 10 receives the file name selection value, the file name range setting value and the file name computing value one by one in real time after they are set successively.

When the back end processing device 20 receives the file name processing value outputted by the front end processing device 10 (step S210), the processing unit 200 in the back end processing device 20 acquires data values from the database 30 according to the file name processing value (step S212). Then, the processing unit 200 generates a multidimensional array according to the acquired data values and the file name processing value (step S214), and the back end processing device 20 outputs the multidimensional array to the front end processing device 10 (step S216). The multidimensional array integrates selected data values into a matrix data structure which having more than one dimension.

After receiving the multidimensional array from the back end processing device 20 (step S218), the front end processing device 10 shows a pivot analysis table according to the multidimensional array (step S220). In this and some embodiments, the front end processing device 10 further shows a histogram according to the multidimensional array according to various requirements and settings.

Additionally, the file name processing value outputted from the front end processing device 10 to the back end processing device 20 can be recorded in a storage unit, e.g. a non-volatile memory, so that the back end processing device 20 can use the recorded file name processing value repeatedly. In an embodiment, the file name processing value is recorded with multidimensional expressions (MDX). The MDX of the file name processing value is generated by the back end processing device 20 automatically when the front end processing device 10 outputs the file name processing value to the back end processing device 20. The detailed settings of the file name selection value, the file name range setting value, the file name computing value and the file name processing value are described as follows.

Figure 4A:
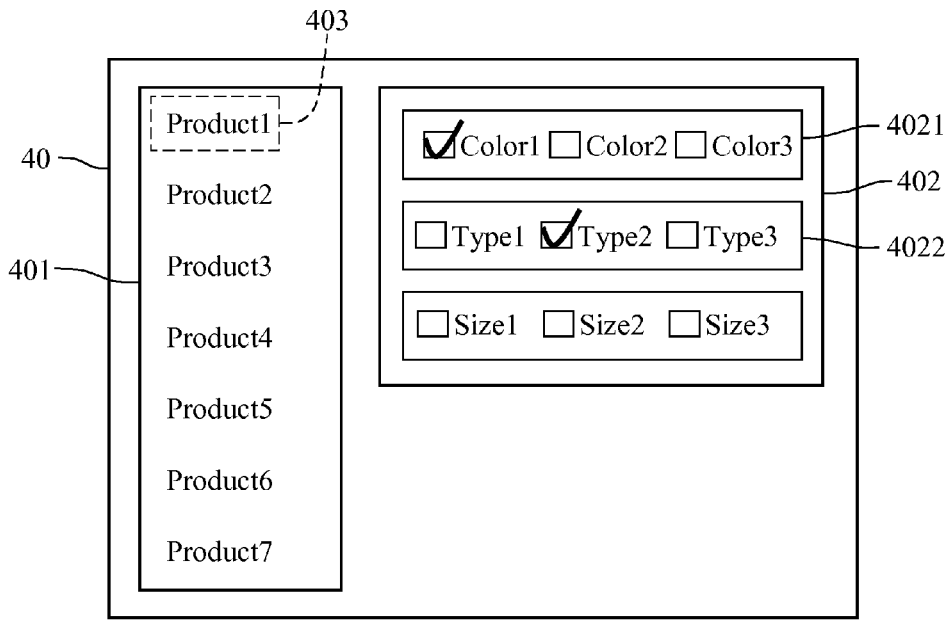
FIG. 4A and FIG. 4B are schematic diagrams of setting a file name selection value in a first sub interface according to an embodiment of the disclosure.
Figure 4B:
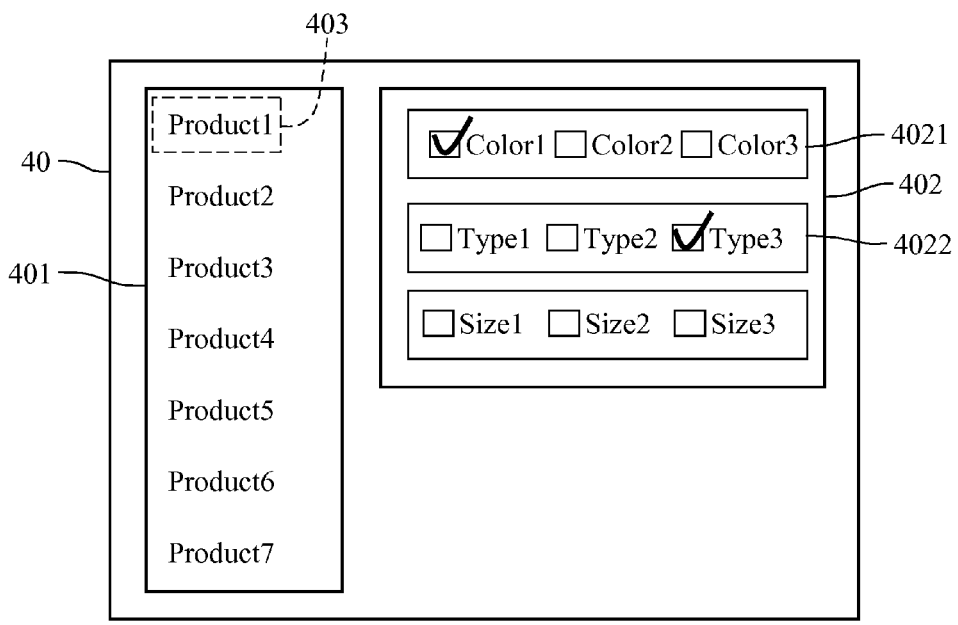

FIG. 4A and FIG. 4B are schematic diagrams of setting a file name selection value in a first sub interface according to an embodiment of the disclosure. A first sub interface 40 is the same as the first sub interface 1000 in FIG. 1. The first sub interface 40 includes a file name list 401 and a secondary file name list 402. The file name list 401 shows a plurality of file names, e.g. Product 1 to Product 7, for selection. For instance, file names in the database are in a hierarchical structure. When one file name is selected, the secondary file name list 402 will show secondary file names, e.g. Color 1 to Color 3, Type 1 to Type 3 and Size 1 to Size 3, for selection.

In FIG. 4A, assume that a file name 403 of Product 1 in the file name list 401 is selected, and that a secondary file name of Color 1 in a secondary file name option list 4021 and a secondary file name of Type 2 in a secondary file name option list 4022 in the secondary file name list 402 are selected. A first setting condition is completed. Similarly, in FIG. 4B, assume that the secondary file name of Color 1 and a secondary file name of Type 3 are selected. A second setting condition is completed. The first setting condition in FIG. 4A and the second setting condition in FIG. 4B are integrated into a file name selection value.

Assume that a file name range setting value and a file name computing value are preset. According to a file name processing value generated by integrating the file name selection value, the preset file name range setting value and the preset file name computing value, a pivot analysis table 50 as shown in FIG. 5 can be established.

Figure 5:
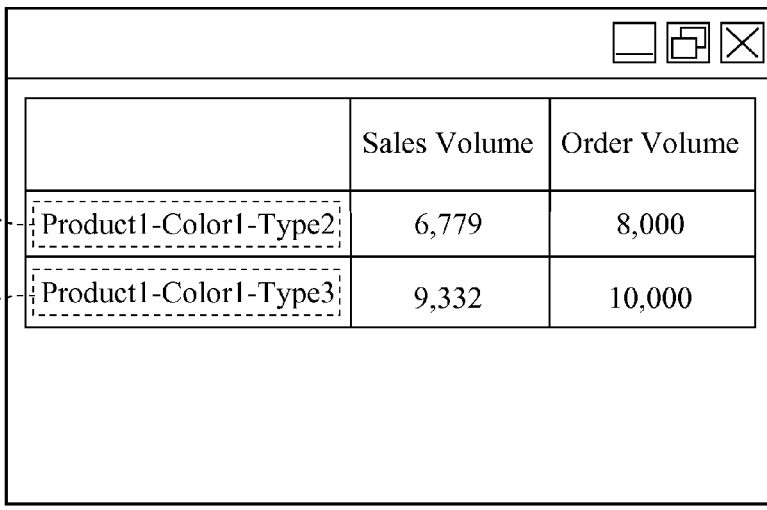
FIG. 5 is a schematic diagram of a pivot analysis table corresponding to the file name selection value set in FIG. 4A and FIG. 4B according to an embodiment of the disclosure.

In FIG. 5, the pivot analysis table 50 shows a pivot analysis field 501 and a pivot analysis field 502, and shows data values selected according to the file name selection value. The pivot analysis field 501 corresponds to the selected result in the secondary file name option list 4021 and 4022 in FIG. 4A, and the pivot analysis field 502 corresponds to the selected result in the secondary file name option list 4021 and 4022 in FIG. 4B. Therefore, desired data values, e.g. the sales volume and order volume, of the pivot analysis fields 501 and 502 corresponding to the selected file name 403 can be known through the pivot analysis table 50.

Figure 6A:
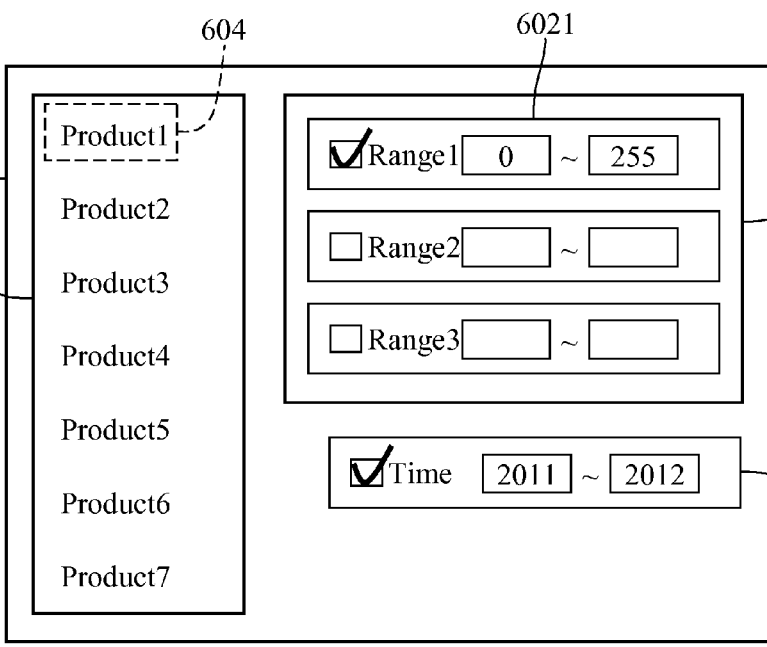
FIG. 6A and FIG. 6B are schematic diagrams of setting a file name range setting value in a second sub interface according to an embodiment of the disclosure.
Figures 6B, 7:
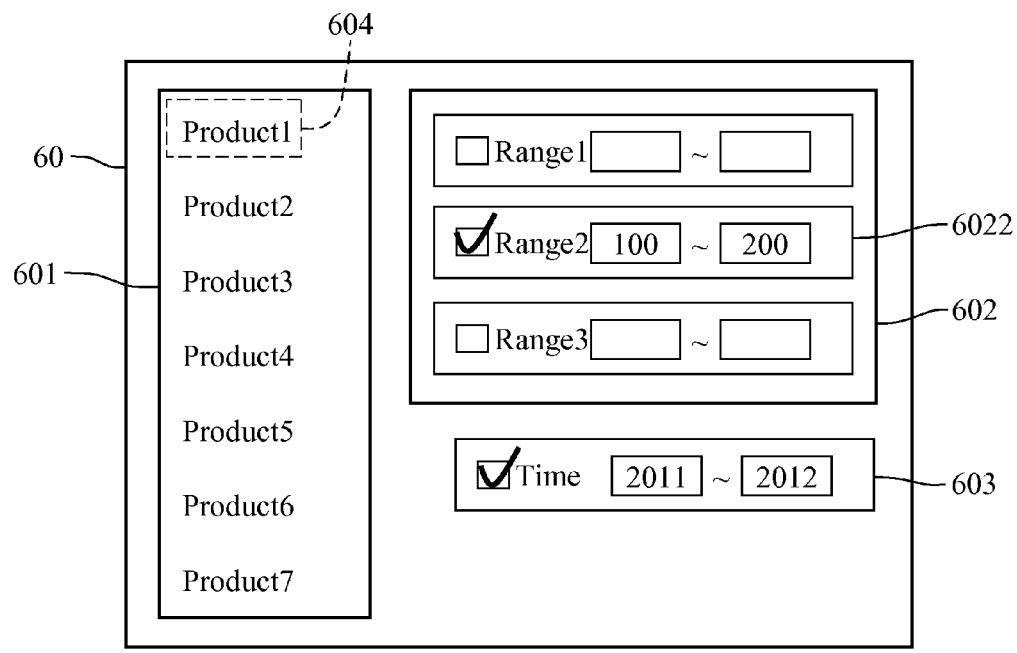
FIG. 7 is a schematic diagram of a pivot analysis table corresponding to the file name range setting value set in FIG. 6A and FIG. 6B according to an embodiment of the disclosure.

FIG. 6A and FIG. 6B are schematic diagrams of setting a file name range setting value in a second sub interface according to an embodiment of the disclosure. A second sub interface 60 is the same as the second sub interface 1001 in FIG. 1. The second sub interface 60 includes a file name list 601, a range setting list 602 and a time period setting list 603. The file name list 601 shows file names as the same as that in FIG. 4A and FIG. 4B. When one file name is selected, the range setting list 602 correspondingly shows range options, e.g. Range 1 to Range 3, for selection and insertion. Each selection range has an upper limit value and a lower limit value. Meanwhile the time period setting list 603 correspondingly shows empty fields for inserting an upper limit value and a lower limit value of a desire time period.

In FIG. 6A, assume that a filed name 604 of "Product 1" in the file name list 601 is selected, that a range option 6021 of Range 1 representing sales volume is selected and is set at 0 to 255, and that the selected time period setting list 603 is selected and is set at AD 2011 to 2012. Subsequently, in FIG. 6B, a range option 6022 of Range 2 representing order volume is selected and is set at 100 to 200, and the selected time period setting list 603 is also set at AD 2011 to 2012. The settings in the range setting list 602 and the settings in the time period setting list 603 in FIG. 6A and FIG. 6B are integrated into a file name range setting value which has an upper limit value and a lower limit value corresponding to the settings.

In this and some embodiments, the ranges relative to the range setting list 602 can be preset for direct selection, and the time period setting list 603 also can provide a plurality of preset time periods for direct selection.

Assume that the file name selection value and the file name computing value are preset. According to a file name processing value generated by integrating the preset file name selection value, the file name range setting value and the preset file name computing value, a pivot analysis table 70 as shown in FIG. 7 can be established.

In FIG. 7, the pivot analysis table 70 shows a pivot analysis field 701, a pivot analysis field 702, a pivot analysis field 703, and data values selected according to the file name range setting value in FIG. 6A and FIG. 6B. The pivot analysis field 701 corresponds to the setting in the time period setting list 603. The pivot analysis field 702 corresponds to the setting in the range setting list 602 in FIG. 6A. The pivot analysis field 703 corresponds to the setting in the range setting list 602 in FIG. 6B.

Therefore, desired data values, e.g. the sales volume and order volume, of the pivot analysis fields 702 and 703 corresponding to the selected file name 604 can be known through the pivot analysis table 70.

Figures 8, 9:
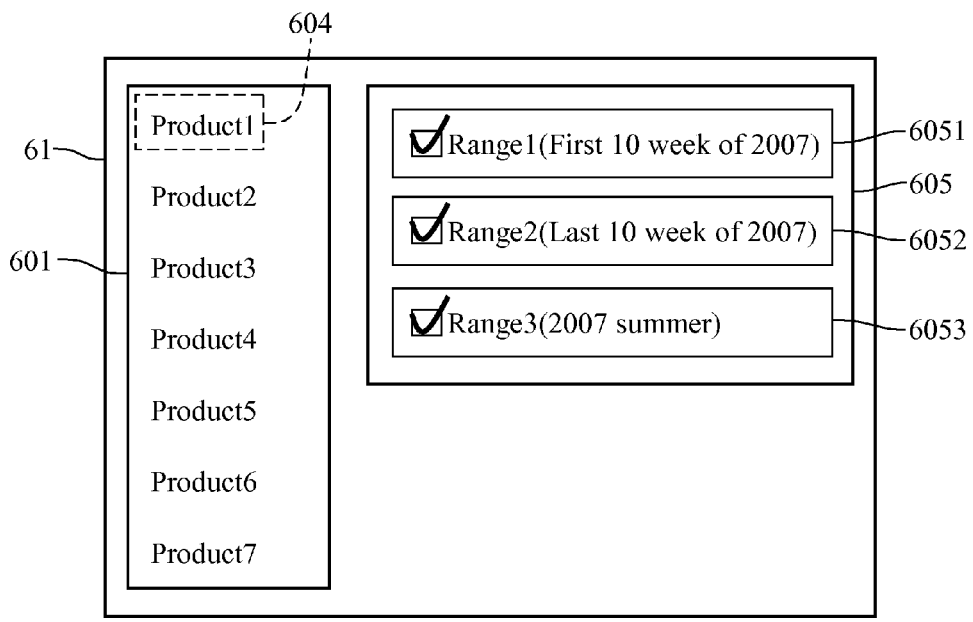
FIG. 8 is a schematic diagram of setting a file name range setting value in a second sub interface according to an embodiment of the disclosure.
FIG. 9 is a schematic diagram of a pivot analysis table corresponding to the file name range setting value set in FIG. 8 according to an embodiment of the disclosure.

FIG. 8 is a schematic diagram of setting a file name range setting value in a second sub interface according to an embodiment of the disclosure. A second sub interface 61 is the same as the second sub interface 1001 in FIG. 1. Difference between the second sub interface 61 and the second sub interface 60 in FIG. 6A to FIG. 6B is that a range setting list 605 in the second sub interface 61 shows range options, e.g. Range 1 to Range 3, of time ranges (the file name range setting value) which specifying specific sales volumes and order volumes. The time range is set by selecting information in a calendar or pull down menus or by inserting desired information directly.

When the file name 604 of "Product 1" in the file name list 601 is selected, the corresponding range setting list 605 will presented. Assume that each time range is preset for selection, and that a time range setting 6051 of "Range 1", a time range setting 6052 of "Range 2" and a time range setting 6053 of "Range 3" in the range setting list 605 are successively selected. The settings in the range setting list 605 are integrated into a file name range setting value.

Assume that the file name selection value and the file name computing value are preset. According to a file name processing value generated by integrating the preset file name selection value, the file name range setting value and the preset file name computing value, a pivot analysis table 71 as shown in FIG. 9 can be established.

In FIG. 9, the pivot analysis table 71 shows a pivot analysis field 704, a pivot analysis field 705, a pivot analysis field 706, and data values selected according to the file name range setting value in FIG. 8. The pivot analysis field 704 corresponds to the time range setting 6051. The pivot analysis field 705 corresponds to the time range setting 6052. The pivot analysis field 706 corresponds to the time range setting 6053.

Therefore, desired data values, e.g. the sales volume and order volume, of the pivot analysis fields 704 to and 706 corresponding to the selected file name 604 can be known through the pivot analysis table 71.

Figures 10, 11:
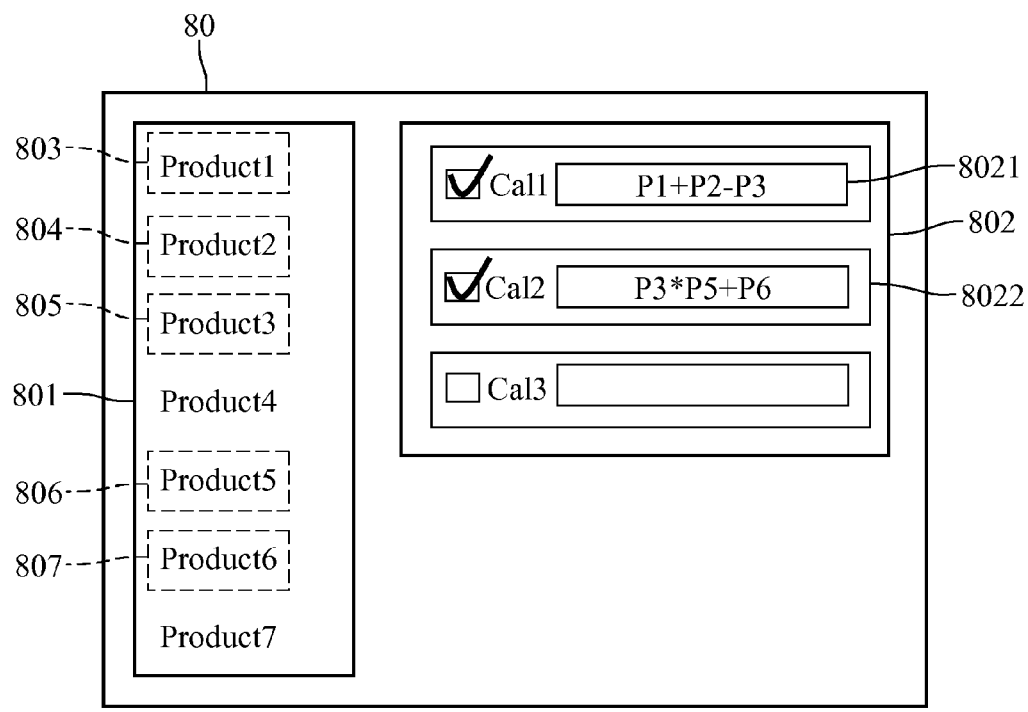
FIG. 10 is a schematic diagram of setting a file name computing value in a third sub interface according to an embodiment of the disclosure.
FIG. 11 is a schematic diagram of a pivot analysis table corresponding to the file name computing value set in FIG. 10 according to an embodiment of the disclosure.

FIG. 10 is a schematic diagram of setting a file name computing value in a third sub interface according to an embodiment of the disclosure. A third sub interface 80 is the same as the third sub interface 1002 in FIG. 1. The third sub interface 80 includes a file name list 801 and a calculation input list 802. The file name list 801 shows file names as the same as that in FIGS. 4A and 4B. The calculation input list 802 shows calculation equation options corresponding to selected file names in file name list 801, for selection and insertion. The calculation equation of each calculation equation option utilizes the data values of the selection file names as parameters, so as to set the computing relationship, e.g. addition, subtraction or percentage, between the selected file names.

Assume that a file name 803 of "Product 1," a file name 804 of "Product 2," a file name 805 of "Product 3," a file name 806 of "Product 5" and a file name 807 of "Product 6" are selected. Calculation equations can be inserted into the calculation input list 802 according to various requirements. Assume that a calculation equation of "P1+P2−P3" indicating a sales volume of the file name 803 plus a sales volume of the file name 804 minus a sales volume of the file name 805, is inserted into a selected calculation equation option 8021 of Cal 1, and that a calculation equation of P3*P5+P6 indicating the sales volume of the file name 805 times a sales volume of the file name 806 plus a sales volume of the file name 807, is inserted into a selected calculation equation option 8022 of Cal 2. P1 represents the data value of the file name 803 of "Product 1", P2 represents the data value 804 of the file name of "Product 2," and the rest can be deduced analogically. The setting in the calculation input list 802 is integrated into a file name computing value.

In a typical table, file names can be arranged in column or in row. Therefore, the third sub interface 80 can perform column computing on the file names in column, or perform row computing on the file names in row. In some embodiments, in order to compare data values more conveniently, percentage can be inserted into the calculation equation, e.g. P1*80%+P2*10%+P3*10%.

In this and some embodiments, the calculation equation in each calculation equation option can be preset for direct selection.

Assume that the file name selection value and the file name range setting value are preset. According to a file name processing value generated by integrating the preset file name selection value, the preset file name range setting value and the file name computing value, a pivot analysis table 90 as shown in FIG. 10 can be established.

In FIG. 11, the pivot analysis table 90 shows a pivot analysis field 901 of Cal 1 and a pivot analysis field 902 of Cal 2, and shows data values, e.g. the sales volume and order volume, selected according to the file name computing value. The pivot analysis field 901 corresponds to the calculation equation option 8021, and the pivot analysis field 902 corresponds to the calculation equation option 8022.

Therefore, the computing relationship between desired data values of the pivot analysis field 901 corresponding to the selected file names 803, 804 and 805, and the computing relationship between desired data values of the pivot analysis field 902 corresponding to the selected file names 805, 806 and 807 can be known through the pivot analysis table 90.

Figure 12:
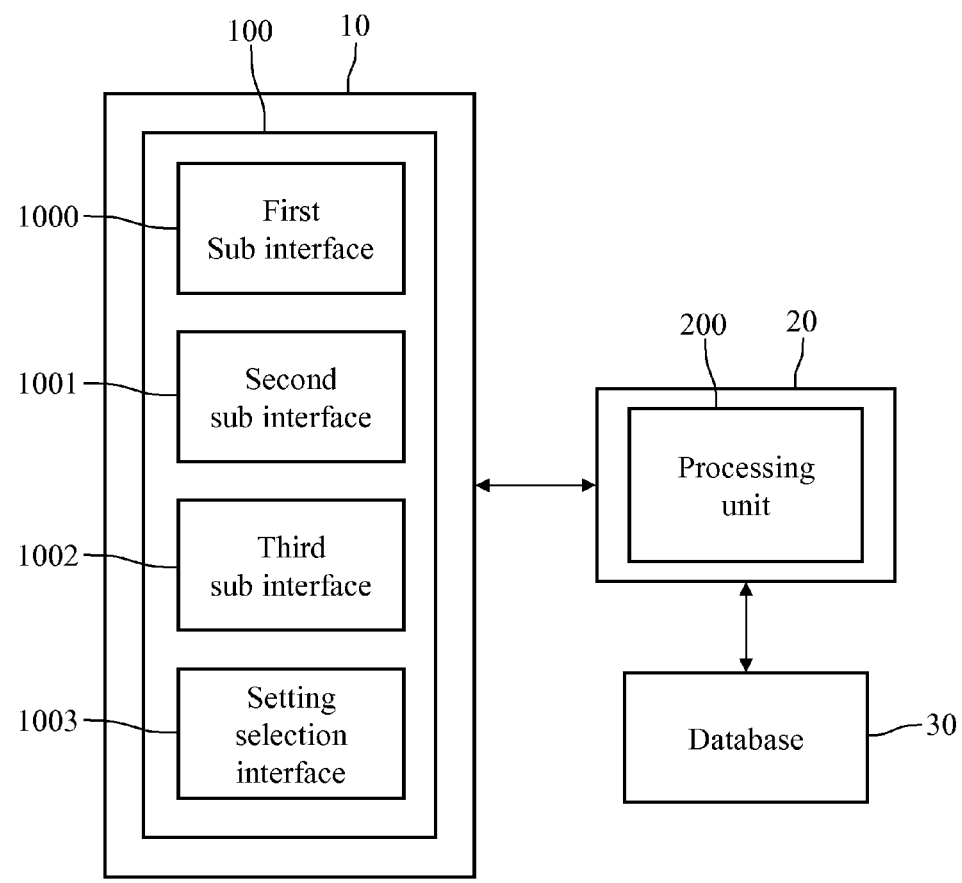
FIG. 12 is a schematic diagram of a pivot analysis system using a condition group according to an embodiment of the disclosure.

On the other hand, the file name processing interface 100 in FIG. 1 further includes a setting selection interface 1003 as shown in FIG. 12. The setting selection interface 1003 shows various stored file name processing values for selection according various requirements. The detailed operation of the setting selection interface 1003 is described as follows.

Figure 13:
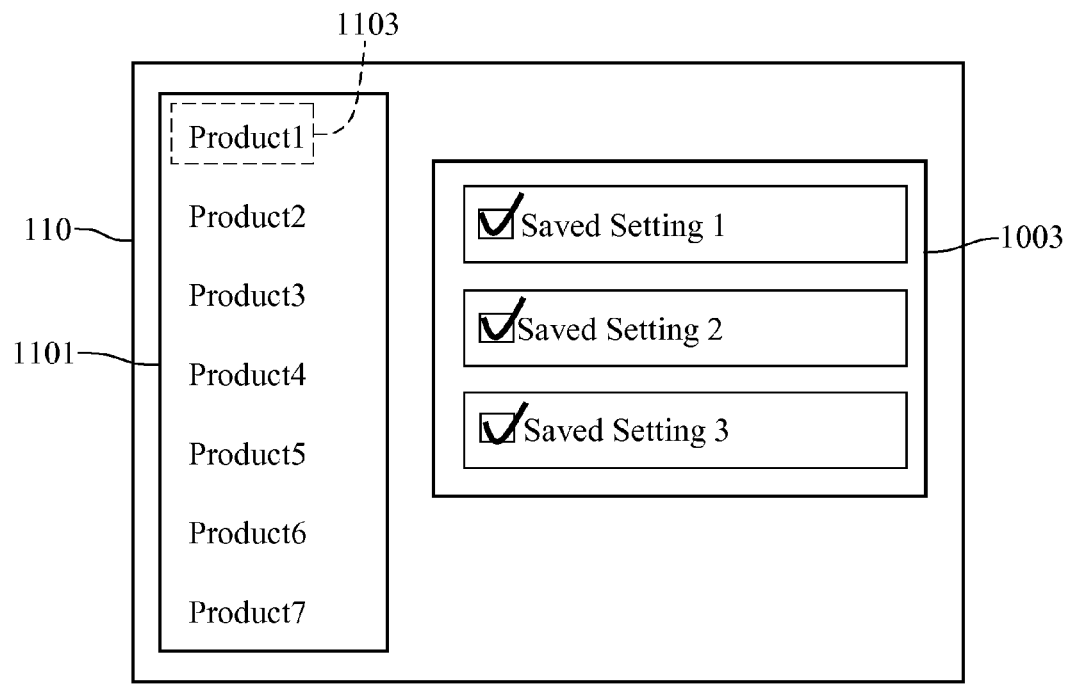
FIG. 13 is a schematic diagram of setting file name processing values according to an embodiment of the disclosure.

FIG. 13 is a schematic diagram of setting file name processing values according to an embodiment of the disclosure. A setting selection interface 110 is the same as the setting selection interface 1003 In FIG. 12. The setting selection interface 110 shows a file name list 1101 and a setting selection list 1102. The file name list 1101 is the same as the file name list 401 in FIG. 4A and FIG. 4B. When a file name 1103 of Product 1 is selected, corresponding setting options, e.g. Saved Setting 1 to Saved Setting 3, will be shown in the setting selection list 1102 for selection. Each setting option corresponds to one stored file name processing value.

Figure 14:
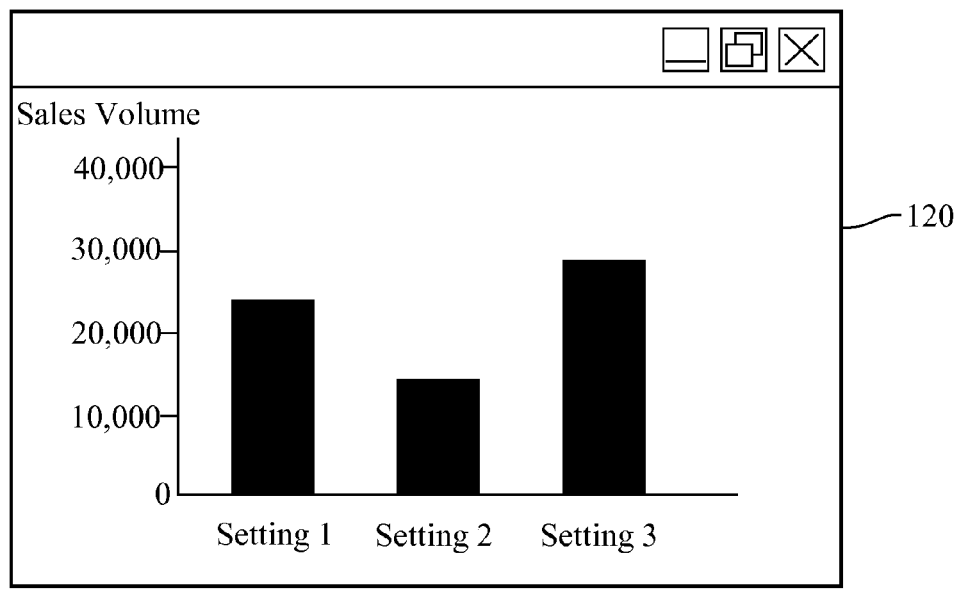
FIG. 14 is a schematic histogram corresponding to the file name processing values selected in FIG. 13 according to an embodiment of the disclosure.

Assume that setting options of Saved Setting 1, Saved Setting 2 and Saved setting 3 are selected. A histogram 120 corresponding to the selected setting options is established as shown in FIG. 14. In FIG. 14, the abscissa represents file name processing values, and the ordinate represents sales volumes. Through the histogram 120, multidimensional information of the selected file name 110 of Product 1 can be known.

In an embodiment of the disclosure, a pivot analysis table can also established according to a file name processing value generated by integrating the file name selection value set in FIG. 4A and FIG. 4B, the file name range setting value set in FIG. 6A and FIG. 6B, and the file name computing value set in FIG. 10.

In the disclosure, the content of the pivot analysis table and the content of the histogram can be arranged according to various requirements.

In the pivot analysis method using a condition group, a pivot analysis table and/or a histogram can be outputted according to the file name processing value after the file name processing value is set by the file name processing interface in the front end processing device. The file name processing value includes the file name selection value, the file name range setting value and the file name computing value, and is used for selecting and processing data values in the database. The file name selection value is used for selecting desired file names. The file name range setting value is used for setting ranges of data values corresponding to the desired file names. The file name computing value is used for setting the computing relationship between data values of the desired file names.

Moreover, the file name processing value can be recorded in the back end processing device for repeated use. In this way, a user can set a new file name processing value or use the stored file name processing value to obtain a desired pivot analysis table, thereby making data analysis more convenient.

What is claimed is:

1. A pivot analysis method using a condition group, being applicable to a front end processing device, and comprising:
   presenting a file name processing window on the front end processing device according to a plurality of file names received from an OLAP server;
   receiving a file name selection value via a first sub window of the file name processing window;
   receiving a file name range setting value via a second sub window of the file name processing window;
   receiving a file name computing value via a third sub interface of the file name processing interface;
   outputting a file name processing value to the OLAP server, the file name processing value is generated by integrating the file name selection value, the file name range setting value and the file name computing value;
   receiving a multidimensional array from the OLAP server; and
   presenting a pivot analysis table according to the multidimensional array;
   wherein the first sub window, the second sub window and the third sub window are graphical interfaces, and each of the first sub window, the second sub window and the third sub window includes a file name list showing the plurality of file names selectable.

2. The pivot analysis method according to claim 1, wherein the file names are used for representing a plurality of data values.

3. The pivot analysis method according to claim 1, wherein the file name selection value comprises a part of the file names.

4. The pivot analysis method according to claim 1, wherein the file name range setting value comprises an upper limit value and a lower limit value which are set according to the file names.

5. The pivot analysis method according to claim 1, wherein the file name computing value comprises a column computing result, a row computing result and a percentage which are set according to the file names.

6. The pivot analysis method according to claim 1, further comprising:
   presenting a histogram according to the multidimensional array.

7. A pivot analysis method using a condition group, being applicable to a back end processing device, and comprising:
   receiving a file name processing value;
   acquiring a plurality of data values in a database according to the file name processing value when an existing record corresponding to the file name processing value is not stored in the back end processing device;
   generating a multidimensional array according to the data values and the file name processing value when the existing record corresponding to the file name processing value is not stored in the back end processing device;
   generating the multidimensional array according to the existing record when the existing record corresponding to the file name processing value is stored in the back end processing device; and
   outputting the multidimensional array;
   wherein the back end processing device is an OLAP server, the file name processing value is generated by integrating a file name selection value, a file name range setting value and a file name computing value, the file name selection value is received by a first sub window, the file name range setting value is received by a second sub window, the file name computing value is received by a third sub window, the first sub window, the second sub window and the third sub window are graphical interfaces, and each of the first sub window, the second sub window and the third sub window includes a file name list showing the plurality of file names selectable.

8. The pivot analysis method according to claim 7, wherein the back end processing device connects to the database.

9. The pivot analysis method according to claim 7, wherein the data values are in a multidimensional and hierarchical form.

10. A pivot analysis method using a condition group, being applicable to a front end processing device and a back end processing device, and comprising:
    outputting a plurality of file names in a database to the front end processing device by the back end processing device;
    receiving the file names via the front end processing device;
    presenting a file name processing window on the front end processing device according to the file names via the front end processing device;
    receiving a file name selection value by the front end processing device through a first sub window of the file name processing window;
    receiving a range setting value by the front end processing device through a second sub window of the file name processing window;
    receiving a file name computing value by the front end processing device through a third sub window of the file name processing window;
    outputting a file name processing value to the back end processing device by the front end processing device, wherein the file name processing value is generated by integrating the file name selection value, the file name range setting value and the file name computing value;
    receiving a file name processing value from the front end processing device by the back end processing device;
    acquiring a plurality of data values in the database according to the file name processing value via the back end processing device when an existing record corresponding to the file name processing value is not stored in the back end processing device;
    generating a multidimensional array according to the data values and the file name processing value via the back end processing device when the existing record corresponding to the file name processing value is not stored in the back end processing device;
    generating the multidimensional array according to the existing record when the existing record corresponding to the file name processing value is stored in the back end processing device; and;
    outputting the multidimensional array from the back end processing device to the front end processing device;

receiving the multidimensional array via the front end processing device; and presenting a pivot analysis table according to the multidimensional array via the front end processing device;

wherein the back end processing device is an OLAP server, the first sub window, the second sub window and the third sub window are graphical interfaces, and each of the first sub window, the second sub window and the third sub window includes a file name list showing the plurality of file names selectable.

11. The pivot analysis method according to claim 10, wherein the file name processing value is stored in the back end processing device.

* * * * *